Apr. 24, 1923.  
O. J. FROCK  
1,453,098  
PRESSURE EQUALIZER FOR HYDRAULIC BRAKES  
Filed Jan. 27, 1922  
2 Sheets-Sheet 1
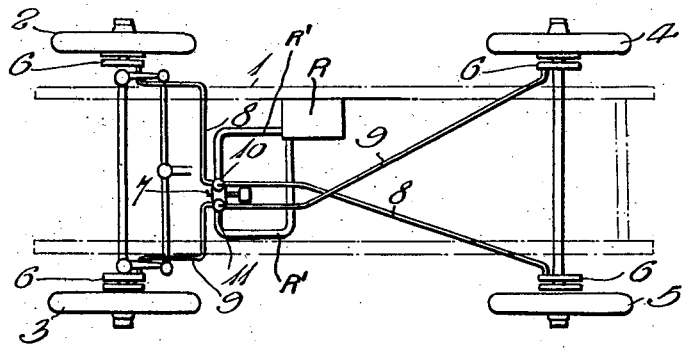
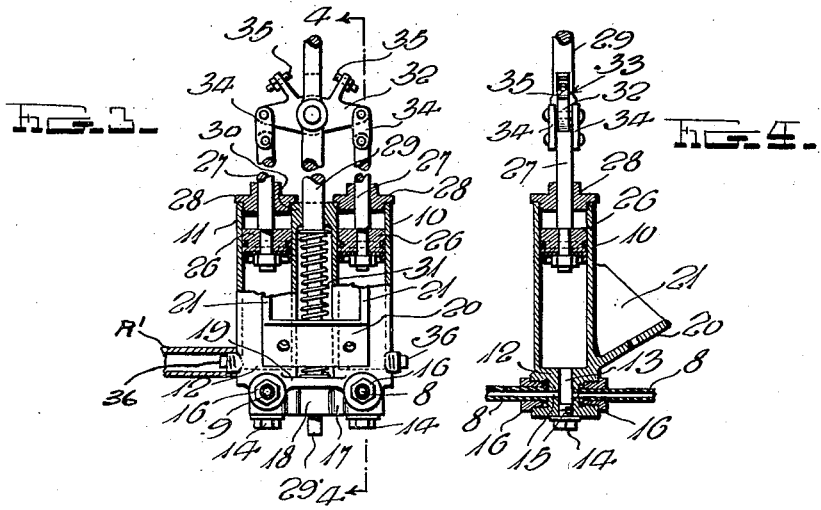
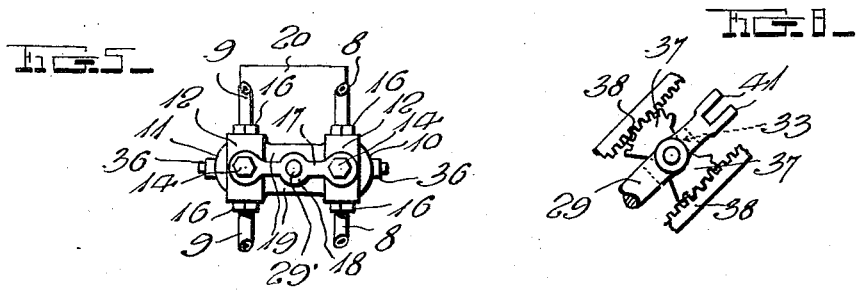
INVENTOR
OSCAR J. FROCK
BY
ATTORNEY

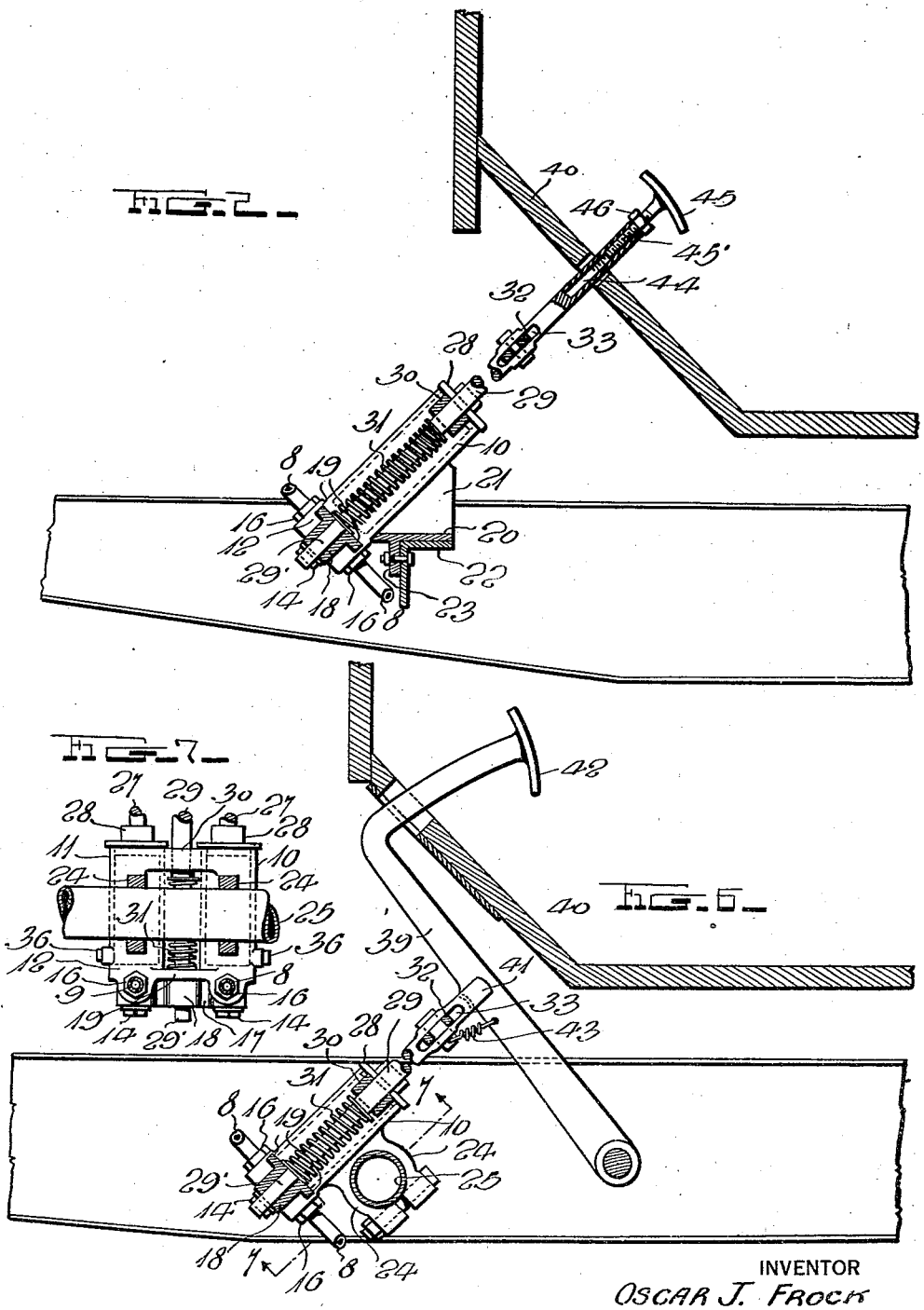

Patented Apr. 24, 1923.

1,453,098

UNITED STATES PATENT OFFICE.

OSCAR J. FROCK, OF WILMINGTON, DELAWARE.

PRESSURE EQUALIZER FOR HYDRAULIC BRAKES.

Application filed January 27, 1922. Serial No. 532,088.

*To all whom it may concern:*

Be it known that I, OSCAR J. FROCK, a citizen of the United States, residing at Wilmington, in the county of New Castle and State of Delaware, have invented certain new and useful Improvements in Pressure Equalizers for Hydraulic Brakes, of which the following is a specification.

This invention relates to an improved brake construction and has special reference to brakes of the hydraulic type used upon automobiles and in which a brake is provided for each wheel of the automobile and pressure applied by means of a compound pressure cylinder operated by means of a foot treadle.

It has been found in brake structures as now constructed that if one of the pipes leading from the single pressure cylinder to the brakes leaks or is punctured in any manner, the whole structure is rendered inoperative as the puncture or leak prevents pressure being applied.

Therefore one of the objects of this invention is to provide a brake structure having an improved construction of pressure applying means and pipes whereby the brakes may be connected in pairs with a separate pressure cylinder for each pair of brakes thus leaving one pair of brakes operative in case one of the pipes leading to the brakes should be broken.

Another object of the invention is to so connect the brakes with the cylinders that the brakes will be connected in diagonally disposed relation to the car. By having the brakes connected in this manner, a rear brake upon one side of the car will be connected with a front brake upon the other side and if one of the pipes should break and thus render a pair of brakes inoperative, this would leave one good brake upon each side of the car and therefore when the brakes are applied one brake upon each side of the car will operate and side skidding will be prevented.

Another object of the invention is to so construct the pressure device that pistons operating in separate cylinders thereof may be operated from a single treadle and each apply the same amount of pressure.

Another object of the invention is to so construct the pressure device that when one set of brakes is rendered inoperative due to the puncture of a pipe, the piston for forcing the fluid under pressure to the second set of brakes may still be effectively operated when the operator's foot is placed upon the treadle.

Another object of the invention is to provide a brake structure of the character set forth which will be simple in construction, easy to operate and not liable to readily get out of order.

This invention is illustrated in the accompanying drawings, wherein:

Figure 1 is a plan view of a chassis showing the improved brake structure applied.

Figure 2 is an enlarged sectional view through the pressure applying and equalizing device.

Figure 3 is a view taken at right angles to Figure 2 and showing the device partially in elevation and partially in section.

Figure 4 is a sectional view taken along the line 4—4 of Fig. 3.

Figure 5 is a bottom plan view of the pressure applying device.

Figure 6 is a view similar to Fig. 2 showing a modified construction.

Figure 7 is a view taken along the line 7—7 of Fig. 6.

Figure 8 is a fragmentary view showing a modified form of pressure equalizing cross bar.

Referring to the accompanying drawings it will be seen that this improved brake structure is used in connection with an automobile having a chassis indicated in general by the numeral 1, front wheels 2 and 3 and rear wheels 4 and 5. Each wheel is provided with a brake 6 of a conventional fluid pressure type and in order to supply fluid to the brakes, there has been provided a pressure creating device 7 having separate side portions from which extend pipes 8 and 9, the pipes 8 of one side leading to the brakes of the wheels 2 and 5 and the pipes 9 of the other side leading to the brakes of the wheels 3 and 4.

By having this pressure device provided with separate side portions having pipes leading to the brakes arranged in pairs diagonally of the chassis a front brake on one side of the automobile and a rear brake upon the opposite side thereof will be operated from each side portion of the pressure creating device and if a pipe or pipes leading from one side should be broken, the other set of brakes would still be operative and brakes upon opposite sides of the automobile applied. By having brakes upon opposite sides of the automobile applied at equal pressure the automobile will be very effectively checked and danger of side skidding from an uneven application of the brakes prevented. It will be further noted from the following that the pressure creating device is so constructed that even pressure can be applied at both sides so that the four brakes will be equally applied and further that the operating means is so constructed that a single foot pedal may be used for operating both sides of the pressure device or one side if a pipe leading to one of the brakes should leak or be broken.

The pressure creating device is in the form of a pump structure having side cylinders 10 and 11 each of which is provided with a base portion 12 having a passage 13 formed therein and closed at its lower end by a removable plug 14 and having side ports 15 through which fluid may pass into the pipes 8 or 9 secured by glands 16. These side cylinders are connected at their lower ends by a cross web 17 having a bearing 18 intermediate its length and braced by side webs 19. A plate 20 extends from the lower portions of the cylinders and is braced by webs or side arms 21 so that the presure creating device will be firmly held in place when the fasteners are put in place and passed through a cross bar 22 of the chassis. The fasteners may be passed through openings formed in the plate 20 as shown in Fig. 4 or if desired the plate may be provided with a depending strip 23 having fastener-receiving openings as shown in Fig. 2. In Figures 6 and 7, there has been shown a modified construction in which clamps 24 extend from the cylinders so that the device may be secured to a cross bar 25 which is circular in cross section and will preferably be formed of tubing.

In order to force fluid from the cylinders through the pipes to the brakes, each cylinder is provided with a piston 26 and packing similar to those used in hydraulic jacks and having a piston rod 27 slidably passing through the cap 28 which closes the upper end of the cylinder. A plunger 29 slidably passes through a bearing 30 between the upper ends of the cylinders and is provided with a reduced lower end portion 29′ which extends through the bearing 18. A spring 31 is provided upon the reduced lower end portion between the bearings 18 and 30 and serves to yieldably retain the plunger in a raised position. A cross head 32 is pivotally connected with the plunger and is preferably positioned in a pocket 33 formed as a slot in the plunger. This cross head has its end portions provided with depending links 34 which are connected with the upper ends of the piston rods 27. It will readily be seen that when the plunger is moved downwardly, the cross bar will move the piston rods downwardy to exert pressure and force the fluid through the pipes and apply the brakes. By having the cross bar 32 pivotally mounted, it may tilt and therefore when the plunger is moved downwardly even pressure will be exerted upon the two piston rods. Abutments 35 are provided so that if one of the pipes should be punctured, the cross head will not be allowed to tilt a sufficient amount to prevent the desired pressure from being obtained in the cylinder having the unbroken pipes leading therefrom. It will thus be seen that the two pumps can both be operated by the same plunger and both exert the same pressure upon the brakes controlled thereby. Check valves 36 which open inwardly are provided at the lower ends of the cylinders so that fluid which may leak out will be replenished from a reserve reservoir R attached to any convenient place on the car and having pipes R′ leading therefrom to the valves.

In Fig. 8, there has been shown a modified construction in which the cross head is provided with enlarged end portions 37 arcuate in shape and having gear teeth for meshing with co-operating teeth formed upon the pump shafts and constituting racks 38. This construction permits the piston rods to have longitudinal movement relative to the plunger.

In order to operate the pressure creating device, there will be provided a foot treadle 39 as shown in Fig. 6 or the plunger 29 may be extended through the foot board 40 of the automobile body as shown in Fig. 2. In the form shown in Fig. 6, the treadle 39 is pivotally mounted beneath the body of the car and is in the form of a lever which extends between ears 41 at the upper end of the plunger and has its free end portion extended upwardly through the foot board and provided with a foot plate 42. By pressing upon the foot plate, the treadle will be swung downwardly and the plunger forced downwardly against the action of the spring 31 and when pressure is removed the spring 31 returns the plunger and treadle to the normal position. A spring 43 is provided to retain the treadle in place between the ears 41.

In the form shown in Fig. 2 the plunger extends up through the foot board and has its upper end provided with a threaded socket 44 to receive the threaded stem 45′ of the foot plate 45. By this arrangement, the foot plate can be placed at the desired distance above the foot board and secured by means of the lock nut 46.

There has thus been provided a pressure creating device so constructed that pressure may be equally applied to all of the brakes and danger of skidding due to uneven pressure avoided.

There has further been provided a device so constructed that diagonally disposed brakes may be operated together with each set provided with a separate pressure cylinder thus permitting one set of front and rear brakes to be operated even if the other set is rendered inoperative.

Changes in the specific construction and arrangement of parts is contemplated and therefore I do not limit myself to the exact construction and arrangement of parts described and shown as the same may be varied within the limits of the following claims without departing from the spirit of the invention.

What is claimed is:

1. A brake structure comprising fluid brakes, and pressure applying means comprising separate cylinders, separate pipes connecting the brakes in pairs and connecting each cylinder with a pair of brakes to be controlled thereby, pistons in said cylinders, and common actuating means for causing movement of said pistons in an operative direction.

2. In combination with fluid actuated brakes for vehicles, a pressure creating device for the brakes comprising separate pump elements each having a cylinder and a piston therein, separate pipes connecting the brakes in pairs and connecting each cylinder with a pair of brakes to be controlled thereby, and means for imparting sliding movement to the pistons in said cylinders and permitting said pistons to have movement relative to each other.

3. A brake structure comprising fluid brakes arranged diagonally in pairs, each pair having a common pressure applying element, and common actuating means for said pressure applying element.

4. A brake structure comprising fluid brakes arranged in pairs with the brakes of each pair upon opposite sides of a vehicle, a pressure applying element for each pair of brakes, and common actuating means for said pressure applying elements.

5. A brake structure comprising fluid brakes arranged in pairs with the brakes of each pair upon opposite sides of a vehicle, a pressure applying element for each pair of brakes including a cylinder, pipes leading from the cylinder and connected with the brakes, a piston in each cylinder, and common actuating means for said pistons.

6. In combination with fluid actuated brakes for vehicles, a pressure creating device for the brakes comprising separate pump elements each having a cylinder and a piston therein having a piston rod extending through the end of the cylinder, a sliding plunger, and means extending transversely of the plunger and having loose connection with the plunger and piston rods to impart sliding movement from the plunger to the piston rods and permit of the piston rods having movement relative to each other and relative to the plunger.

7. In combination with fluid actuated brakes for vehicles, a pressure creating device for the brakes comprising separate pump elements each having a cylinder and a piston therein having a piston rod extending through the end of the cylinder, a sliding plunger, and a cross head pivotally carried by said plunger and having loose connection with said piston rods to impart sliding movement to the same and permit limited movement relative to each other and relative to the plunger.

8. In combination with fluid actuated brakes for vehicles, a pressure creating device for the brakes comprising separate pump elements each having a cylinder and a piston therein having a piston rod extending through the end of the cylinder, a sliding plunger, a cross head pivotally connected with the plunger and extending transversely thereof, and links loosely connected with the end portions of the cross head and upper ends of the piston rods.

9. The structure of claim 7 having upper and lower bearing elements connecting the cylinders, the plunger being positioned between the cylinders and slidably mounted in the bearings connecting the cylinders, the plunger being provided with a shoulder beneath the upper bearing element, and a spring upon the plunger between the bearing elements and yieldably holding the plunger against downward movement.

10. In combination with fluid actuated brakes for vehicles, a pressure creating device for the brakes comprising independent cylinders having outlets and valve controlled inlets at their lower ends, a plunger slidably mounted between the cylinders, pistons in the cylinders having piston rods extending through the upper ends of the cylinders, a cross head pivotally carried by said plunger and having loose connection with the piston rods, and means for forcing the plunger downwardly.

11. The structure of claim 10 having the plunger extended upwardly above the cross head, and a treadle member provided with a stem adjustably connected with the upper portion of the plunger.

In testimony whereof I affix my signature.

OSCAR J. FROCK.